(12) United States Patent
Kim

(10) Patent No.: US 7,441,903 B2
(45) Date of Patent: Oct. 28, 2008

(54) POWER ON/OFF SYSTEM OF THIN PROJECTOR AND METHOD FOR CONTROLLING THE SAME

(75) Inventor: Hong Ki Kim, Daegu (KR)

(73) Assignee: LG Electronics Inc., Seoul (KR)

( * ) Notice: Subject to any disclaimer, the term of this patent is extended or adjusted under 35 U.S.C. 154(b) by 487 days.

(21) Appl. No.: 11/305,106

(22) Filed: Dec. 19, 2005

(65) Prior Publication Data

US 2007/0052930 A1     Mar. 8, 2007

(30) Foreign Application Priority Data

Sep. 6, 2005    (KR) .................... 10-2005-0082740

(51) Int. Cl.
*G03B 21/16*    (2006.01)
(52) U.S. Cl. .................. 353/61; 353/121; 353/119; 348/748
(58) Field of Classification Search ............. 353/57–61, 353/97, 119, 122; 349/58; 348/748; *G03B 21/16*
See application file for complete search history.

(56) References Cited

U.S. PATENT DOCUMENTS

| 7,086,739 B2 * | 8/2006 | Kida et al. .................. 353/52 |
| 7,232,225 B2 * | 6/2007 | Shiraishi .................. 353/57 |
| 2005/0030493 A1 * | 2/2005 | Wu .................. 353/119 |
| 2005/0068505 A1 * | 3/2005 | Momose et al. .................. 353/97 |
| 2005/0151933 A1 * | 7/2005 | Tsai et al. .................. 353/57 |

FOREIGN PATENT DOCUMENTS

| JP | 2000-305175 | 11/2000 |
| JP | 2001-242542 | 9/2001 |
| JP | 2003-043577 | 2/2003 |

OTHER PUBLICATIONS

PCT Search Report dated May 26, 2006.

* cited by examiner

*Primary Examiner*—Andrew T Sever
(74) *Attorney, Agent, or Firm*—Ked & Associates, LLP

(57) ABSTRACT

A power on/off system of a thin projector including an optical system arranged in a housing with a panel shape having lateral sides and a front side having an area larger than an area of each lateral side is disclosed. The power on/off system includes a door, fans which cool a lamp, a shutter which opens/closes a projection lens, a first sensing unit which senses malfunctions of the lamp, the fans, the door, and the shutter, a second sensing unit which senses an internal temperature of the housing, and a controller which sequentially controls, in response to power-on of the thin projector, operations of opening the door and the shutter, driving the fans, driving the lamp, and sequentially controls, in response to power-off of the thin projector, operations of turning off the lamp, driving the fans, turning off the fans, and closing the door and shutter.

20 Claims, 5 Drawing Sheets

POWER ON/OFF SYSTEM OF THIN PROJECTOR AND METHOD FOR CONTROLLING THE SAME

This application claims the benefit of the Korean Patent Application No. 10-2005-0082740 filed on Sep. 6, 2005, which is hereby incorporated by reference as if fully set forth herein.

BACKGROUND OF THE INVENTION

1. Field of the Invention

The present invention relates to a projector, and more particularly, to a power on/off system of a thin projector and a method for controlling the same.

2. Discussion of the Related Art

The recent tendency of display devices is to provide a large screen size as well as lightness and thinness.

Of such display devices, projectors have been greatly highlighted because they can realize a large screen of 100 inches or more.

Such a projector is a display device which projects an image generated from a micro device such as a liquid crystal display (LCD) panel, a liquid crystal on silicon (LCOS) panel, or a digital micromirror device (DMD) panel, onto a screen, thereby displaying the image.

Generally, such a projector is classified into a single panel type, a double panel type, or a triple panel type in accordance with the number of micro devices used in the projector.

In a single panel type projector, white light is separated into color light components in a time-division manner, and the separated color light components are illuminated to a single micro device. In a two-panel type projector, white light is separated into color light components in a space-division and time-division manner, and the color light components are illuminated to two micro devices. In a three-panel type projector, white light is separated into color light components in a space-division manner, and the color light components are illuminated to three micro devices.

Conventional projectors generally have a rectangular hexahedral appearance such that the top/bottom side thereof has an area larger than that of the front side thereof where a projection lens unit is arranged.

As a result, such a conventional projector has a problem in that there is a limitation to the installation space of the projector because an increased space must be provided in rear of the front side of the projector where the projection lens unit is arranged.

In order to solve this problem, conventional projectors use an optical system configured to bend the path of light using mirrors. In such projectors, however, there is still a limitation in reducing the projector thickness.

Accordingly, a thin projector has been developed which includes a housing having a panel shape such that optical elements including a projection lens are vertically arranged.

However, since such a thin projector has an arrangement different from those of general projectors, it is greatly necessary to design an efficient system for the thin projector, and to develop techniques associated with power on/off control for the thin projector.

SUMMARY OF THE INVENTION

Accordingly, the present invention is directed to a power on/off system of a thin projector and a method for controlling the same that substantially obviate one or more problems due to limitations and disadvantages of the related art.

An object of the present invention is to provide a power on/off system of a thin projector capable of efficiently controlling power on/off of each element in the thin projector, taking into consideration the arrangement characteristics of the thin projector for thinness, and a method for controlling the power on/off system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a power on/off system of a thin projector, which includes an optical system arranged in a housing with a panel shape having lateral sides and a front side having an area larger than an area of each lateral side, the optical system including a lamp, a display, and a projection lens, comprises: a door which opens/closes an air inlet or an air outlet allowing air to pass through the interior of the housing; at least one fan which is arranged in the interior of the housing, and is adapted to cool the lamp; a shutter which opens/closes the projection lens externally exposed from the housing; a first sensing unit which senses malfunctions of the lamp, the fan, the door, and the shutter; a second sensing unit which senses an internal temperature of the housing; and a controller which sequentially controls, in response to power-on of the thin projector, operations of opening the door and the shutter, driving the fan, and determining whether or not there is a malfunction associated with the opening of the door and the shutter, through the sensing units, driving the lamp, and determining whether or not there is a malfunction associated with the driving of the lamp and the fan, and sequentially controls, in response to power-off of the thin projector, operations of turning off the lamp, driving the fan, turning off the fan after a predetermined time elapses, closing the door and shutter, and determining whether or not there is a malfunction associated with the closing of the door and shutter, through the sensing units.

The power on/off system may further comprise a door timer which is driven in accordance with a control signal from the controller, to set an opening time of the door, a cooling timer which is driven in accordance with a control signal from the controller, to set a driving time of the fan, and a display which displays a warning message in accordance with a control signal from the controller.

In another aspect of the present invention, a power-on control method for a thin projector including an optical system arranged in a housing with a panel shape having lateral sides and a front side having an area larger than an area of each lateral side, a fan adapted to cool a lamp arranged in the housing, an air inlet, an air outlet, a door adapted to open/close the air inlet or the air outlet, and a shutter adapted to open/close a projection lens, comprises the steps of: powering on the thin projector; opening the door and the shutter; driving the fan; determining whether or not there is a malfunction as to the opening of the door; determining whether or not there is a malfunction as to the opening of the shutter when it is determined that there is no malfunction as to the opening of the door; driving the lamp when it is determined that there is no malfunction as to the opening of the shutter; determining whether or not there is a malfunction as to the driving of the lamp; determining whether or not there is a malfunction as to the driving of the fan when it is determined that there is no malfunction as to the driving of the lamp; and completing the power-on control when there is no malfunction as to the driving of the fan.

The power-on control method may further comprise the step of executing an initialization, prior to the step of opening the door and the shutter.

The power-on control method may further comprise the step of driving a door timer to check an opening time of the door, following the step of opening the door and the shutter.

In another aspect of the present invention, a power-off control method for a thin projector including an optical system arranged in a housing with a panel shape having lateral sides and a front side having an area larger than an area of each lateral side, a fan adapted to cool a lamp arranged in the housing, an air inlet, an air outlet, a door adapted to open/close the air inlet or the air outlet, and a shutter adapted to open/close a projection lens, comprises the steps of: powering off the thin projector; turning off the lamp; driving the fan; turning off the fan after a predetermined time elapses; closing the door and the shutter; determining whether or not there is a malfunction as to the closing of the door; determining whether or not there is a malfunction as to the closing of the shutter when it is determined that there is no malfunction as to the closing of the door; and completing the power-off control when there is no malfunction as to the closing of the shutter.

The step of turning off the fan after the predetermined time elapses may comprise the steps of: resetting a cooling timer to check a driving time of the fan; determining whether or not a current temperature is lower than a predetermined reference temperature, after a predetermined time elapses; determining whether or not a set time of the cooling timer has elapsed when the current temperature is lower than the predetermined reference temperature; and turning off the fan when it is determined that the set time of the cooling timer has elapsed.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

The concept of the present invention is to efficiently power on/off each constituent element of a thin projector including an optical system configured to reduce the thickness of the projector.

Figure 1:
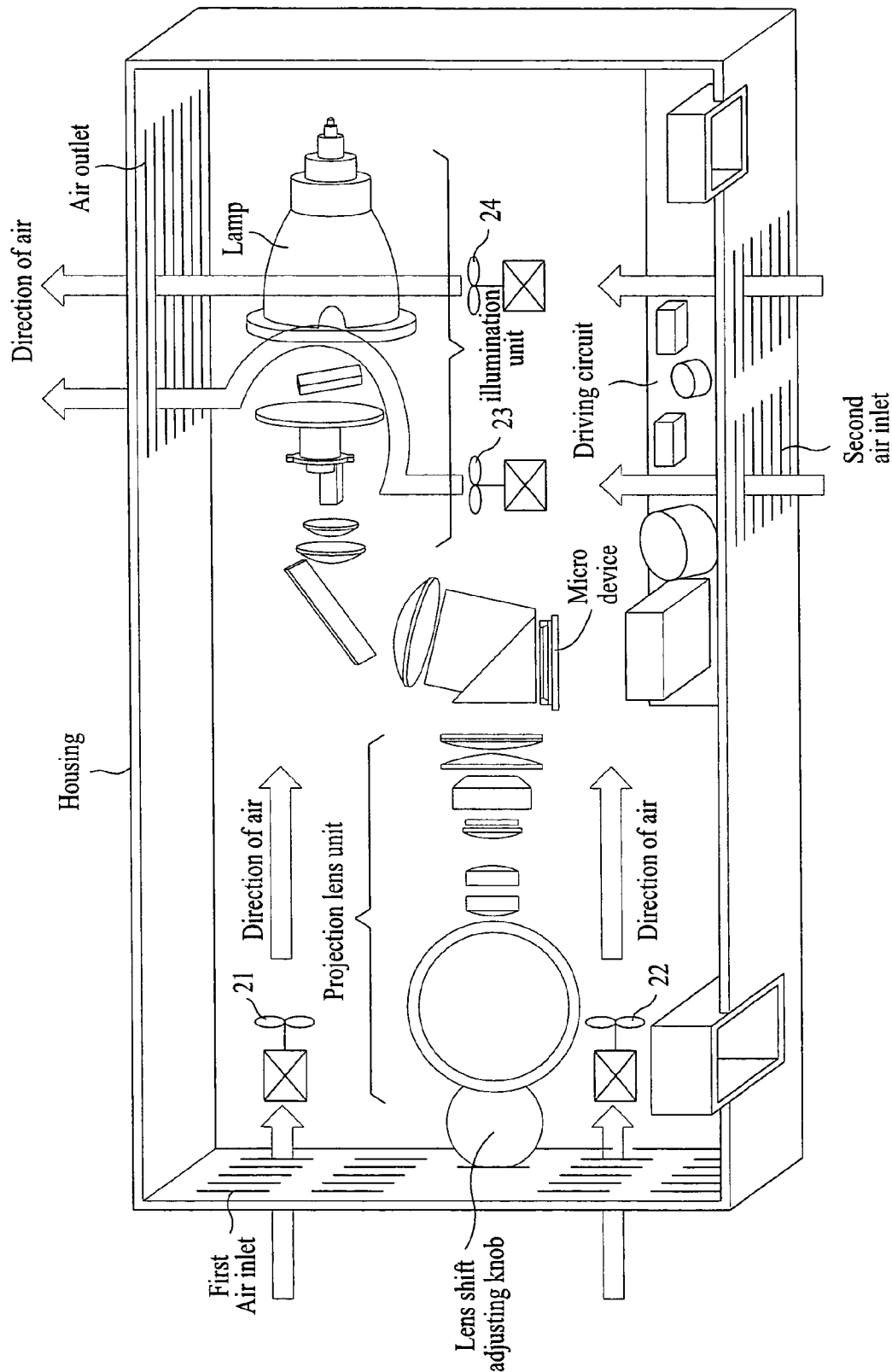
FIG. 1 is a view illustrating an optical system of a thin projector, to which the present invention is applied.
Figure 2:
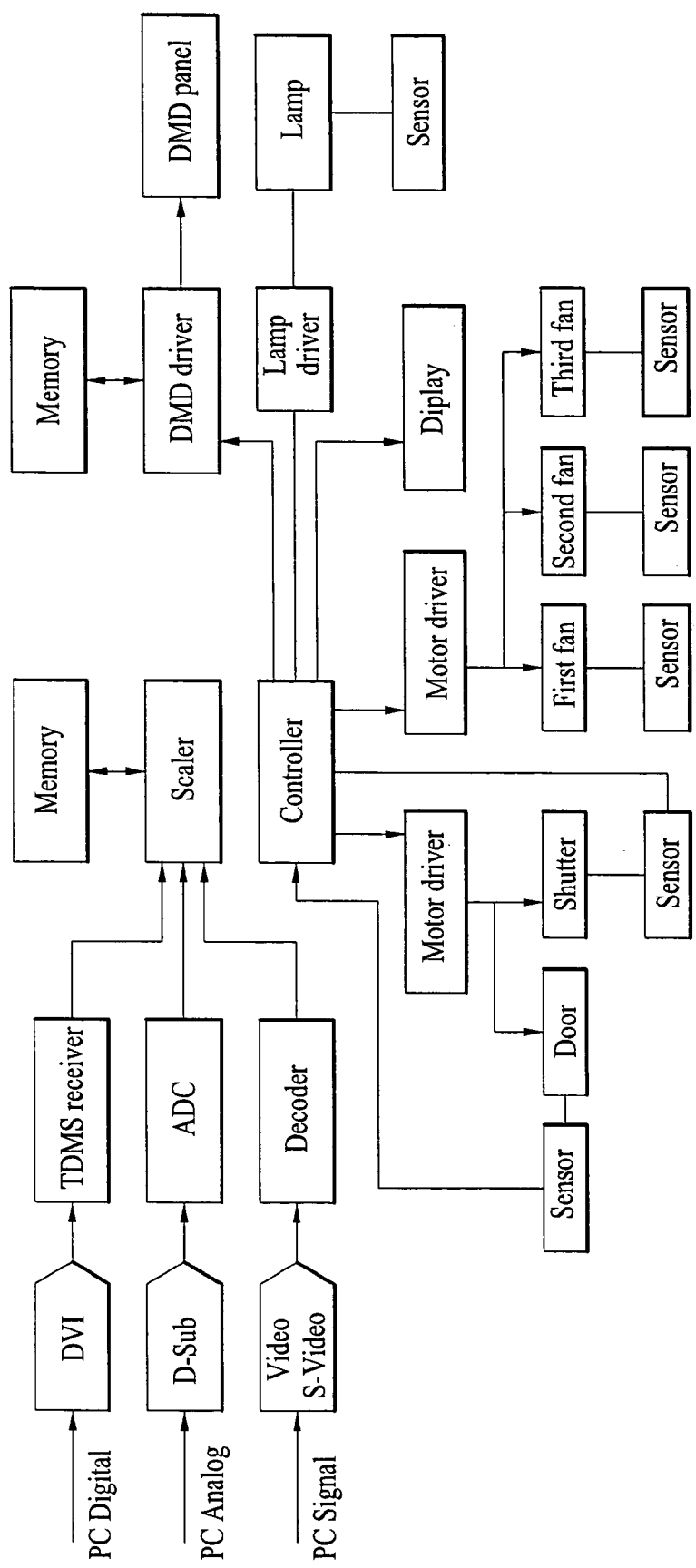
FIG. 2 is a block diagram illustrating a power on/off system of a thin projector according to the present invention.

FIG. 1 is a view illustrating an optical system of a thin projector, to which the present invention is applied. FIG. 2 is a block diagram illustrating a power on/off system of a thin projector according to the present invention.

As shown in FIGS. 1 and 2, the thin projector mainly includes a projection lens unit, a micro device, an illumination unit including a lamp, a driving circuit, and first, second, third, and fourth fans 21, 22, 23, and 24 which establish air flow paths, respectively. The thin projector also includes a housing which protects the constituent elements of the thin projector.

The housing has an upright panel shape.

It is preferred that the projection lens unit of the thin projector be arranged at one lateral side of the housing, the illumination unit be arranged at the top side of the housing, and the driving circuit, which drives the projection lens unit, illumination unit, and micro device, be arranged at the bottom side of the housing.

A lens shift adjusting knob is externally exposed through the lateral side of the housing where the projection lens unit is arranged. The lens shift adjusting knob functions to shift the projection lens unit.

It is also preferred that first and second air inlets be formed at the lateral side of the housing where the projection lens unit is arranged and at the bottom side of the housing where the driving circuit is arranged, respectively. Also, it is preferred that an air outlet be formed at the top side of the housing where the illumination unit is arranged.

In this case, it is preferred that the lamp of the illumination unit be arranged beneath the air outlet. This is because rapid and efficient cooling is achieved when the lamp, which generates a large amount of heat, compared to other elements, is arranged near the air outlet.

In order to achieve an enhancement in cooling efficiency, the thin projector also includes fans arranged over and beneath the projection lens unit and beneath the illumination unit, respectively.

In the illustrated case, the thin projector includes a first fan 21 arranged over the projection lens unit, a second fan 22 arranged beneath the projection lens unit, a third fan 23 arranged beneath an illumination lens set of the illumination unit, and a fourth fan 24 arranged beneath the lamp of the illumination unit.

The first fan 21 is arranged in the housing at an upper portion of the housing near the projection lens unit, to form an air flow path along the upper portion of the housing.

The second fan 22 is arranged in the housing at a low portion of the housing near the projection lens unit, to form an air flow path at the lower portion of the housing.

The third fan 23 is arranged in the housing between a selected one of heat sources, namely, the lamp, and the second air inlet, to form an air flow path extending from the bottom side of the housing to the top side of the housing. The fourth fan 24 is arranged at one side of the third fan 23, to form an air flow path extending from the bottom side of the housing to the top side of the housing while extending around the lamp.

If necessary, an additional fan may be arranged in a lamp module of the lamp, in order to cool the lamp alone.

In accordance with the above-described configuration, air is introduced into the housing through the first and second air inlets by the first and second fans 21 and 22, and is then discharged from the housing through the air outlet formed at the top side of the projector by the third and fourth fans 23 and 24.

In a particular air flow path design, the number of the fans may be adjusted to efficiently cool the projector.

Doors are mounted to the housing at positions corresponding to the air inlets and/or air outlet, in order to prevent foreign matter such as dust from being introduced into the housing in a state in which the thin projector does not operate. Each door opens/closes the associated air inlet or air outlet, in order to selectively allow air to be introduced into the housing.

A shutter is also mounted to the housing at a position corresponding to a projection lens of the projection lens unit externally exposed from the housing, in order to shield the projection lens from foreign matter such as dust in a state in which the thin projector does not operate.

First and second sensing units are arranged in the housing. The first sensing unit functions to sense malfunctions of the lamp, fans, doors, and shutter, whereas the second sensing unit functions to sense the internal temperature of the housing.

The first sensing unit may include first, second, third and fourth sensors which sense malfunctions of the lamp, each fan, each door, and shutter, respectively. The second sensing unit may include a temperature sensor adapted to sense the internal temperature of the housing.

A door timer may also be arranged in the housing, to set the opening time of each door. The door timer is driven in accordance with a control signal from a controller, so as to cause the door to be opened for the set opening time. A cooling timer may also be arranged in the housing, to set the driving time of each fan. The cooling timer is driven in accordance with a control signal from the controller, so as to cause the fan to be driven for the set driving time.

A display may be mounted to an outer surface of the housing, to display a warning message in accordance with a control signal from the controller.

Meanwhile, the controller efficiently controls the constituent elements of the thin projector including the doors, shutter, fans, and lamp in accordance with power on/off control operations for the constituent elements.

That is, the controller may sequentially control, in response to power-on of the thin projector, operations of opening the doors and shutter, driving the fans, and determining whether or not there is a malfunction associated with the opening of the doors and shutter, through the sensing units, driving the lamp, and determining whether or not there is a malfunction associated with the driving of the lamp and the fans, and may sequentially control, in response to power-off of the thin projector, operations of turning off the lamp, driving the fans, turning off the fans after a predetermined time elapses, closing the doors and shutter, and determining whether or not there is a malfunction associated with the closing of the doors and shutter, through the sensing units.

The controller may also control the display to display a warning message when it is determined that there is a malfunction, based on the results of the malfunction determination as to the opening/closing of the doors or shutter or the results of the malfunction determination as to the driving of the lamp or fans.

The controller also controls the driving of the door timer in order to determine whether or not a malfunction as to the opening of the doors occurs after a predetermined time elapses. In addition, the controller controls the driving of the cooling timer, and compares the current temperature sensed by a second sensing unit with a predetermined reference temperature, in order to turn off the fans after a predetermined time elapses.

Figure 3:
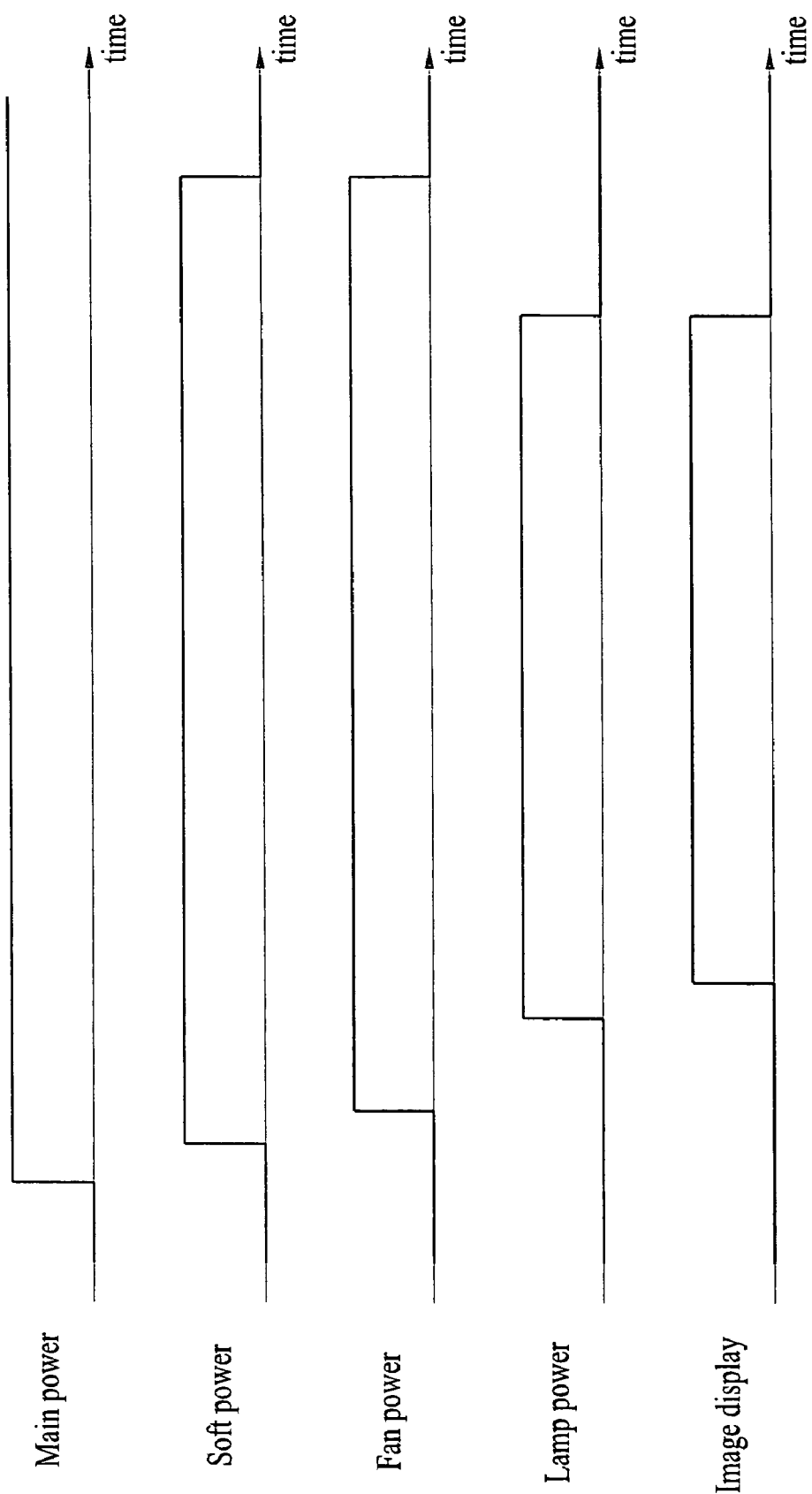
FIG. 3 is a diagram illustrating a power on/off timing sequence in the power on/off system of the thin projector according to the present invention.

FIG. 3 is a diagram illustrating a power on/off timing sequence in the power on/off system of the thin projector according to the present invention.

As shown in FIG. 3, in a power-on control method according to the present invention, when main power is applied to the system, application of soft power is first carried out to drive the doors and shutter.

Thereafter, application of fan power to drive the fans is carried out. Application of lamp power to drive the lamp is carried out, so that display of an image is performed.

In a power-off control method according to the present invention, the display, which displays an image, is first turned off. The lamp is then turned off. Subsequently, the fans are turned off, and the doors and shutter are closed.

The above-described power-on/off control method for the thin projector according to the present invention will be described in detail hereinafter.

First, the power-on control method for the thin projector will be described.

Figure 4:
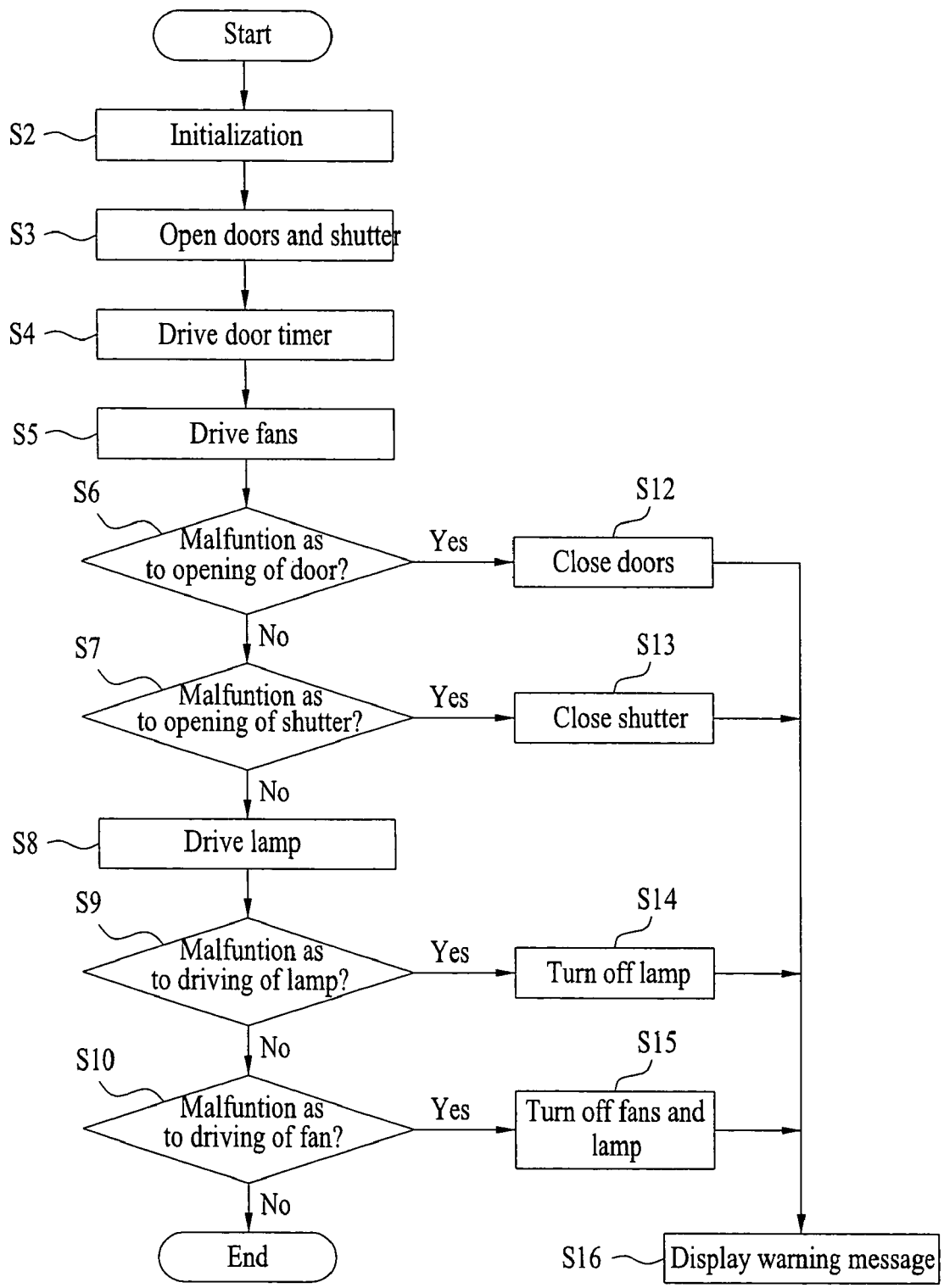
FIG. 4 is a flow chart illustrating a power-on control method for the thin projector according to the present invention.

FIG. 4 is a flow chart illustrating the power-on control method for the thin projector according to the present invention.

As shown in FIG. 4, the controller first initializes the constituent elements of the system (S2).

Thereafter, the controller opens the doors and shutter (S3), and drives the door timer to check the opening time of the doors (S4).

The controller then drives the fans (S5), and determines whether or not a predetermined time set by the door timer has elapsed.

When it is determined that the predetermined time has elapsed, the controller determines whether or not there is a malfunction as to the opening of the doors, through the first sensing unit (S6).

When it is determined that there is no malfunction as to the opening of the doors, the controller determines whether or not there is a malfunction as to the opening of the shutter, through the first sensing unit (S7).

If there is a malfunction as to the opening of doors, the controller closes the doors (S12), and displays a warning message through the display (S16).

When there is no malfunction as to the opening of the shutter, the controller drives the lamp (S8).

However, if there is a malfunction as to the opening of the shutter, the controller closes the shutter (S13), and displays a warning message through the display (S16).

The controller subsequently determines whether or not there is a malfunction as to the driving of the lamp, through the first sensing unit (S9). When there is no malfunction as to the driving of the lamp, the controller determines whether or not there is a malfunction as to the driving of the fans (S10).

When there is no malfunction as to the driving of the fans, the controller completes the power-on/off control. However, if there is a malfunction as to the driving of the lamp, the controller turns off the lamp (S14), and displays a warning message through the display (S16).

On the other hand, if there is a malfunction as to the driving of the fans, the controller turns off the fans and the lamp (S15), and displays a warning message through the display (S16).

Hereinafter, the power-off control method for the thin projector according to the present invention will be described.

Figure 5:
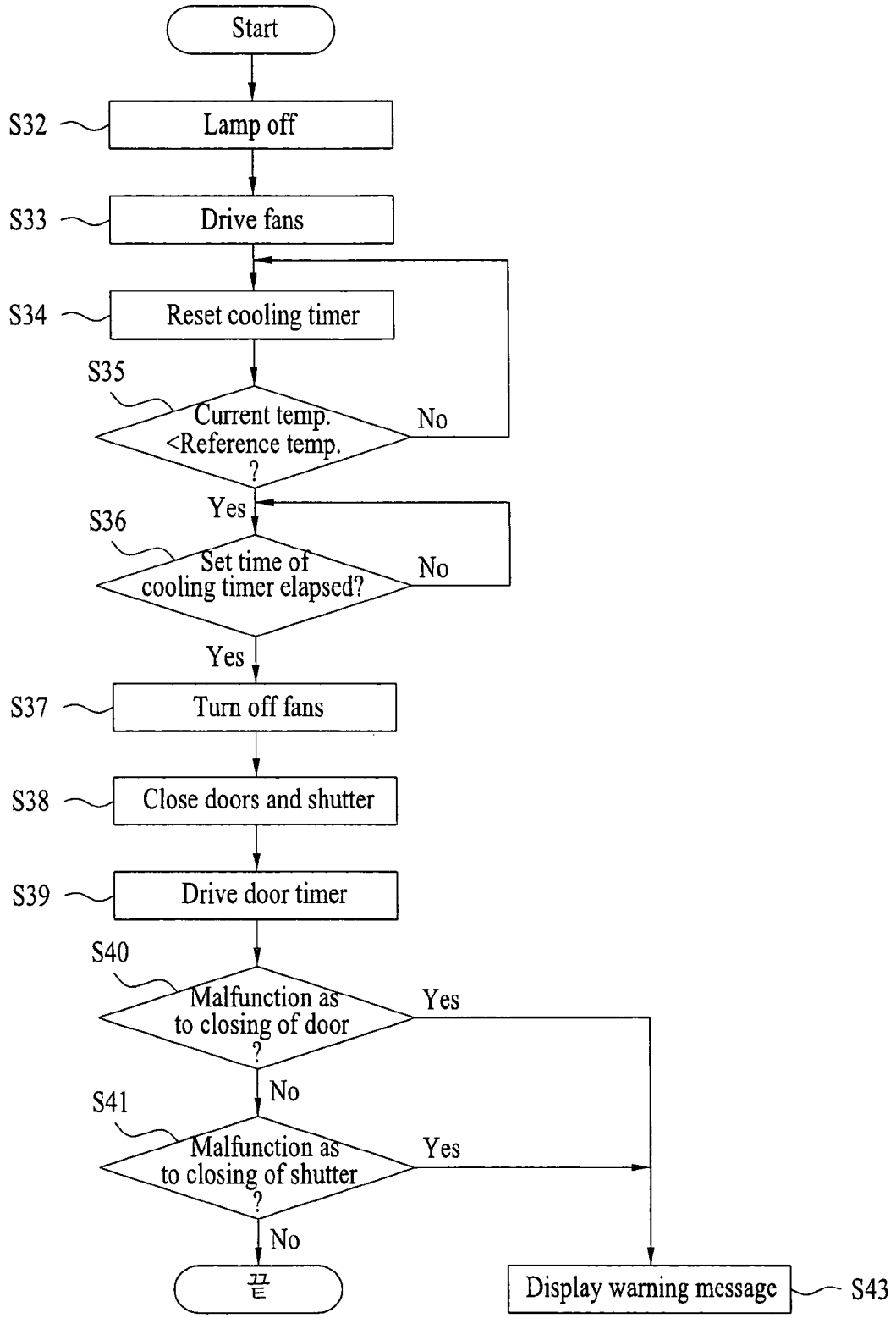
FIG. 5 is a flow chart illustrating a power-off control method for the thin projector according to the present invention.

FIG. 5 is a flow chart illustrating the power-off control method for the thin projector according to the present invention.

As shown in FIG. 5, the controller first turns off the lamp (S2), and drives the fans (S33).

The controller then resets the cooling timer, to check the driving time of the fans (S34), and determines whether or not the current temperature is lower than a reference temperature, through the second sensing unit after a predetermined time elapses (S35).

If the current temperature is lower than the reference temperature, the controller determines whether or not the set time of the cooling timer has elapsed (S36). When the set time of the cooling timer has elapsed, the controller turns off the fans (S37).

However, when the current temperature is not lower than the reference temperature, the controller repeatedly executes the step of resetting the cooling time, and the subsequent steps until the set time of the cooling time elapses (S34). If the set time of the cooling timer has not elapsed, the controller repeatedly executes the step of determining whether or not the set time of the cooling timer has elapsed, until the set time of the cooling timer elapses (S36).

The controller then closes the doors and shutter (S38), and drives the door timer to check the closing time of the doors (S39).

Thereafter, the controller determines whether or not the set time of the door timer has elapsed. When it is determined that the set time of the door timer has elapsed, the controller determines whether or not there is a malfunction as to the closing of the doors, through the first sensing unit (S40).

If there is no malfunction as to the closing of the doors, the controller determines whether or not there is a malfunction as to the closing of the shutter, through the first sensing unit (S41).

If there is no malfunction as to the closing of the shutter, the controller completes the power-off control.

However, when there is a malfunction as to the closing of the doors, the controller displays a warning message through the display. If there is a malfunction as to the closing of the shutter, the controller displays a warning message through the display (S43).

The power on/off system of the thin projector and the control method thereof according to the present invention provide various effects.

That is, first, the power on/off system of the thin projector efficiently controls power on/off of each element in the thin projector, taking into consideration the arrangement characteristics of the thin projector for thinness. Accordingly, it is possible to achieve an enhancement in power efficiency.

Second, the lamp, fans, doors, and shutter of the thin projector are efficiently turned on/off in accordance with the present invention. Accordingly, it is possible to lengthen the life span of the system.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A power on/off system of a thin projector including an optical system arranged in a housing with a panel shape having lateral sides and a front side having an area larger than an area of each lateral side, the optical system including a lamp, a display, and a projection lens, comprising:

a door which opens/closes an air inlet or an air outlet allowing air to pass through the interior of the housing;

at least one fan which is arranged in the interior of the housing, and is adapted to cool the lamp;

a shutter which opens/closes the projection lens externally exposed from the housing;

a first sensing unit which senses malfunctions of the lamp, the fan, the door, and the shutter;

a second sensing unit which senses an internal temperature of the housing; and a controller which sequentially controls, in response to power-on of the thin projector, operations of opening the door and the shutter, driving the fan, and determining whether or not there is a malfunction associated with the opening of the door and the shutter, through the sensing units, driving the lamp, and determining whether or not there is a malfunction associated with the driving of the lamp and the fan, and sequentially controls, in response to power-off of the thin projector, operations of turning off the lamp, driving the fan, turning off the fan after a predetermined time elapses, closing the door and shutter, and determining whether or not there is a malfunction associated with the closing of the door and shutter, through the sensing units.

2. The power on/off system according to claim 1, further comprising:

a door timer which is driven in accordance with a control signal from the controller, to set an opening time of the door;

a cooling timer which is driven in accordance with a control signal from the controller, to set a driving time of the fan; and a display which displays a warning message in accordance with a control signal from the controller.

3. The power on/off system according to claim 2, wherein the controller controls the display to display the warning message when it is determined that there is a malfunction, based on the results of the malfunction determination as to the opening/closing of the door or the shutter or the results of the malfunction determination as to the driving of the lamp or the fan.

4. The power on/off system according to claim 2, wherein the controller controls the driving of the door timer, to determine whether or not a malfunction as to the opening of the door occurs after a predetermined time elapses.

5. The power on/off system according to claim 2, wherein the controller controls the driving of the cooling timer, and compares a current temperature sensed by the second sensing unit with a predetermined reference temperature, to turn off the fan after a predetermined time elapses.

6. The power on/off system according to claim 1, wherein the first sensing unit comprises a first sensor, a second sensor, a third sensor, and a fourth sensor which senses malfunctions of the lamp, the fan, the door, and the shutter, respectively, and the second sensing unit comprises a temperature sensor which senses the internal temperature of the housing.

7. In a power-on/off control method for a thin projector including an optical system arranged in a housing with a panel shape having lateral sides and a front side having an area larger than an area of each lateral side, a fan adapted to cool a lamp arranged in the housing, an air inlet, an air outlet, a door adapted to open/close the air inlet or the air outlet, and a shutter adapted to open/close a projection lens, a power-on control method comprising the steps of:

powering on the thin projector;

opening the door and the shutter;

driving the fan;

determining whether or not there is a malfunction as to the opening of the door;

determining whether or not there is a malfunction as to the opening of the shutter when it is determined that there is no malfunction as to the opening of the door;

driving the lamp when it is determined that there is no malfunction as to the opening of the shutter;

determining whether or not there is a malfunction as to the driving of the lamp;

determining whether or not there is a malfunction as to the driving of the fan when it is determined that there is no malfunction as to the driving of the lamp; and completing the power-on control when there is no malfunction as to the driving of the fan.

8. The power-on control method according to claim 7, further comprising the step of:

executing an initialization, prior to the step of opening the door and the shutter.

9. The power-on control method according to claim 7, further comprising the steps of:

closing the door when it is determined that there is a malfunction as to the opening of the door; and displaying a warning message.

10. The power-on control method according to claim 7, further comprising the steps of:

closing the shutter when it is determined that there is a malfunction as to the opening of the shutter; and displaying a warning message.

11. The power-on control method according to claim 7, further comprising the steps of:

turning off the lamp when it is determined that there is a malfunction as to the driving of the lamp; and displaying a warning message.

12. The power-on control method according to claim 7, further comprising the steps of:

turning off the fan when it is determined that there is a malfunction as to the driving of the fan; and displaying a warning message.

13. The power-on control method according to claim 7, further comprising the step of:

driving a door timer to check an opening time of the door, following the step of opening the door and the shutter.

14. In a power-on/off control method for a thin projector including an optical system arranged in a housing with a panel shape having lateral sides and a front side having an area larger than an area of each lateral side, a fan adapted to cool a lamp arranged in the housing, an air inlet, an air outlet, a door adapted to open/close the air inlet or the air outlet, and a shutter adapted to open/close a projection lens, a power-off control method comprising the steps of:

powering off the thin projector;
turning off the lamp;
driving the fan;
turning off the fan after a predetermined time elapses;
closing the door and the shutter;

determining whether or not there is a malfunction as to the closing of the door;

determining whether or not there is a malfunction as to the closing of the shutter when it is determined that there is no malfunction as to the closing of the door; and completing the power-off control when there is no malfunction as to the closing of the shutter.

15. The power-off control method according to claim 14, wherein the step of turning off the fan after the predetermined time elapses comprises the steps of:

resetting a cooling timer to check a driving time of the fan;

determining whether or not a current temperature is lower than a predetermined reference temperature, after a predetermined time elapses;

determining whether or not a set time of the cooling timer has elapsed when the current temperature is lower than the predetermined reference temperature; and turning off the fan when it is determined that the set time of the cooling timer has elapsed.

16. The power-off control method according to claim 15, further comprising the step of:

repeatedly executing the step of resetting the cooling timer and the subsequent steps when it is determined that the current temperature is not lower than the predetermined reference temperature.

17. The power-off control method according to claim 15, further comprising:

repeatedly executing the step of determining whether or not the set time of the cooling timer has elapsed when it is determined that the set time of the cooling timer has not elapsed.

18. The power-off control method according to claim 14, further comprising the step of:

displaying a warning message when it is determined that there is a malfunction as to the closing of the door.

19. The power-off control method according to claim 14, further comprising the step of:

displaying a warning message when it is determined that there is a malfunction as to the closing of the shutter.

20. The power-off control method according to claim 14, further comprising the step of:

driving a door timer to check a closing time of the door, following the step of closing the door and the shutter.

* * * * *